United States Patent Office 2,829,127  
Patented Apr. 1, 1958

2,829,127

PROCESS FOR OBTAINING PURE PRODUCTS OF POLYMERIZATION OF 11-AMINO UNDECANOIC ACID

Werner Münch, Cesano Maderno, and Luigi Notarbartolo and Rossana Lamma, Milan, Italy, assignors to Perfogit Societa per Azioni, Milan, Italy No Drawing. Application May 20, 1954
Serial No. 431,288

Claims priority, application Italy May 26, 1953

9 Claims. (Cl. 260—78)

It is hardly possible to obtain chemically pure amino undecanoic acid with conventional methods (through undecylenic acid and bromo undecanoic acid) from castor oil on industrial scale.

The purification of 11-amino undecanoic acid is commonly carried out by firstly washing the amino acid repeatedly with water and then recrystallizing it from water under pressure and if needed with the addition of an absorbing means.

In the crystallized amino acid however there remain absorbed considerable quantities of solvent which cannot be eliminated with conventional operations such as filtration and centrifugation. Filtration yields a white paste of which 50 to 55% by weight is water. Owing to this property of the amino acid of persistently retaining the solvent it is difficult to obtain a really pure amino acid. With the water there always remains absorbed in the amino acid traces of organic impurities such as secondary and other amino acids the constitution of which is not yet sufficiently known as well as inorganic impurities such as ammonium bromide. Even by repeating the purifying process a number of times, in practice said impurities cannot be eliminated quantitatively.

Generally said paste containing water is fed direct to further working stages without any previous drying. It can be dissolved under pressure by heating up to about 150° C., and this is advantageous for the purpose of manufacture.

With conventional processing methods as commonly used at the present time, said paste is dehydrated directly or after having been dissolved, with batch operation in an autoclave or with continuous operation by evaporation of water and then it is directly polymerized with a continuous or a batch process after addition of conventional stabilizers. With that process, the aforesaid impurities remain in the polymerized product.

It is also known, on the other hand, that products of polymerization, particularly if they are prepared with a view of being transformed into fibres, should be extremely pure. Hence also the above mentioned small amounts of impurities still constitute a factor prejudicing the quality of the finished product. Moreover, during manufacture there arise difficulties because said impurities may have to a certain extent a stabilizing effect and since their amount varies with the different batches or charges, said stabilizing effect is not always the same. To obtain products having the same viscosity, the amount of stabilizer to be added should vary with the individual charges and it should be determined each time empirically by preliminary tests.

It has found that with the new method hereinafter described it is possible to clear amino undecanoic acid from its impurities to a considerable extent and that it is also possible to improve the conventional method so as to make preparation more economical and simple. It has been found that almost anhydrous amino undecanoic acid can be separated from its suspension or solution in water, in the form of a prepolymerized product, by heating the product containing water for a short time at temperatures of polyamide formation, viz. temperatures higher than 180° C., for instance 200° C. In this way, a separation into layers of water and of preliminary condensation product is obtained, which is fluid at this temperature. Any inorganic impurities such as ammonium bromide, that the preliminary product might contain, pass almost quantitatively into the aqueous layer and so does also part of the organic impurities. In accordance with the invention the water thus separated is removed in the liquid state from the amino acid and substantially all of the soluble inorganic impurities as well as part of the organic impurities are eliminated at the same time. Besides purification this process affords the further advantage of saving the quite relevant amount of heat that was needed with the conventional process to evaporate the water.

However, with this simplest mode of operation of the new method it is not yet possible to purify the amino acid completely because the secondary products that are hydrophobic dissolve in the pre-polymerization product but not in water.

Hence it is advisable to consider the possibilities afforded by the new method, already during the recrystallization or the purification of the amino acid.

In accordance with this process, the presence of small amounts, in particular of inorganic substances, is no longer troublesome because they can be substantially eliminated quantitatively with water afterwards.

Consequently, inorganic alkalies or acids or their salts may be added to the paste of the amino acid or to its solution at a conveniently selected time, said additional compounds being selected among those which form at least with part of the organic impurities insoluble or hardly soluble salts; the amino acid being recrystallized thereafter with conventional methods, if needed in the presence of surface active agents, to eliminate said impurities by means of filtration. Any possible excess of said inorganic substances added would certainly be separated during the subsequent separation from water according to the new process herein described.

During polymerization, moreover, more alkalies, acids or salts, inorganic or organic, may be added, which as experience has taught dissolve the last traces of impurities which possibly might still be present.

Among the substances which have proved effective if introduced prior to filtering, in a limited amount, there may be mentioned, by way of example, calcium chloride, calcium glycolate or calcium butyrate, or even any alkali or alkaline-earth salt, in particular an organic hydrophilic acid, specially a hydroxylic acid.

During the preparation of the pre-polymerized product with separation of water, there may be added in particular small amounts of sodium and potassium hydroxide or carbonate, of salts of organic acids with said alkalies, organic alkalies such as piperidine or piperidine chloride, organic acids, preferably hydrophilic ones, or hydroxylic acids, such as glycolic acid, butyric acid or butyrolactone and inorganic acids such as hydrochloric acid.

Although, if this new method is used, the amino acid polymer is purified to a very great extent and purification may be practically complete, nevertheless it may happen that traces of impurities insoluble or scarcely soluble in water remain in solution in the pre-polymerized product. Probably these impurities form in this way only during the preparation of the pre-polymerized or polymerized product from other secondary products of 11-amino undecanoic acid with separation of the volatile bases. To prepare a highly pure polymer, the pre-polymerized product is conveniently extracted with an organic solvent such as benzene, cyclohexane, benzine or methanol.

The process of the invention may be carried out in a number of various ways, with continuous operation or with batch operation.

The simplest non-continuous method is heating the amino acid containing water, during from 1 hour to 5 hours, to a temperature of preferably 230° C. in a closed autoclave. Then it is allowed to cool down, the water separated is removed by decanting off and the solid block of pre-polymerized product obtained is washed to clean the surface, once or several times, with cold or better with warm water.

It is preferable not to cool down completely the pre-polymerized product after its preparation, but only down to any temperature lower than the melting point of said pre-polymerized product, which melting point is about 180° C.; then water should be removed, always in the liquid state, by means of a valve provided on the bottom and subsequently the product should be washed with warm water again. Then it may be heated again up to a temperature of from 210 to 230° C., the product of pre-polymerization may be melted, extracted in the liquid state and new solution may be pumped direct into the hot autoclave, repeating the entire process.

Instead of washing the hot product in the autoclave, it may even be washed while it is cold, with warm or cold water, after having left the autoclave. In general, the subsequent washing of the pre-polymerized product becomes necessary only if extraneous substances were added prior to its preparation.

It is also possible to carry out the process as a continuous process, but this offers certain difficulties. The pre-polymerized product has substantially the same specific gravity as water and as long as there is still any water in the autoclave, it is not possible, therefore, to extract it merely by taking it off from the bottom of the autoclave or from above the aqueous layer. Generally the pre-polymerized product separates in the space along a wall of the autoclave. Nevertheless, it is possible to carry out the process as a continuous process. It is possible, e. g., to increase the specific gravity of the pre-polymerized product by introducing into the autoclave a fair amount of sand or gravel of medium fineness, which sand or gravel should be very clean in order to avoid changes of colour. The sand distributes quantitatively in the pre-polymerized product, whence the latter deposits on the bottom of the autoclave, wherefrom it is possible to tap it off continuously, free from sand, by means of a filter composed of a number of metal gauzes. The water is tapped off from time to time by means of a pipe applied below the liquid level. The autoclave is fed with new solution, as the pre-polymerized product and water are being let off.

The following examples illustrate the invention without limitation.

*Example 1*

2 kg. of a paste containing 900 g. of dry technical grade 11-amino undecanoic acid and 1100 g. of water, were heated to 230° C. during one and a half hours in a closed autoclave. After cooling down, the autoclave was opened and the water separated from the pre-polymerized amino acid was poured off. 976 g. of a white mass were obtained, which was solid and easily crumbling and which contained still slight amounts of water. The mass obtained was comminuted, washed superficially with hot water and dried, whereafter it weighed 886 g. The wash water was added to the originally separated water and the bromine ions contained therein were determined by titration with n/10 solution of silver nitrate. 100 g. of dry amino acid had consumed 7.46 cc. of n/10 solution of silver nitrate. Over the overall amount of water, consumption of n/10 silver nitrate solution was 65.9 cc., whence it contained 98% of the bromine ions contained in the starting material. Then the pre-condensation product was polymerized. For this purpose 28.4 of pre-polymerized product and—for comparison—30 g. of 11-amino undecanoic acid were stabilized with 0.405 g. (0.95 mol) of stearic acid each time; then the mixture was heated to 240° C. in hydrogen atmosphere during 42 hours. In both cases 27.3 g. of polymerized product were obtained. The viscosity of the solution of the polymerized product prepared with 11-amino undecanoic acid in meta-cresol, as calculated in accordance with Carothers' formula, amounted to 0.963. The filaments obtained showed a stretchability of 340%. The viscosity of the solution of the condensation product obtained from the pre-polymerization product attained 0.934; the filaments obtained could be stretched to 400%. To attain further purification, the pre-polymerized product was extracted with cyclohexane and then polymerized under same conditions. The viscosity of the solution attained in this case 0.87, the stretchability of the filaments obtained average 470%. With another experiment, a pre-polymerized product was prepared with 2 kg. of the paste mentioned above added with 5 g. of potassium carbonate. The potassium carbonate could be determined quantitatively in the wash water after the elimination of the volatile bases by means of steam distillation. The polymerized products prepared from the pre-polymerized product thus obtained showed slightly improved properties as compared with the condensation products that were prepared from a pre-polymerization product without any addition of potassium carbonate. With a further experiment, a pre-polymerization product was prepared adding to 2 kg. of paste 30 cc. of n/1 hydrochloric acid. The hydrochloric acid could be determined, also in this case, in the water of separation practically quantitatively; the polymerized product showed characteristics analogous to those previously described.

*Example 2*

To 2 kg. of a paste as in Example 1, 5 g. of calcium chloride, 10 g. of active carbon and 600 g. of water were added, then the mass was heated to 130° C. and filtered at this temperature. With the filtrate a new pre-polymerization product was prepared and this was polymerized under the conditions described in Example 1. The viscosity of the solution of the polymerized product attained in this case the value of 0.91 and the filaments were stretchable as an average by 420%.

It is equally possible also to prepare firstly the pre-polymerized product after adding e. g. a calcium salt or charcoal and to filter then the pre-polymerized product as a melt prior to—or, better, after—the separating of water.

We claim:

1. A process for the production of polymers of 11-amino undecanoic acid, comprising the steps of heating monomeric 11-amino undecanoic acid in the presence of at least 50% by weight of water at temperatures above 180° C. whereby to cause formation of a low polyamide, maintaining the water initially present and the reaction water formed concurrently with the polyamide, in the liquid state, separating said water in the liquid state from said polyamide, and further polymerizing said low polyamide by heating the same.

2. A process for the production of polymers of 11-amino undecanoic acid, comprising the steps of heating monomeric 11-amino undecanoic acid in the presence of at least 50% by weight of water in a closed vessel to temperature above 180° C. whereby to cause formation of a low polyamide, cooling said vessel and the contents thereof to temperatures below 180° C., draining the water in the liquid state from said vessel and heating again said vessel and the contents thereof to temperatures above 180° C. to cause further polymerization of said low polyamide.

3. A process for the production of polymers of 11-amino undecanoic acid, comprising reacting monomeric 11-amino undecanoic acid by heating the same in a closed vessel in the presence of at least 50% by weight of water at temperatures above 180° C. to cause the formation of a low polyamide, while maintaining the water initially present and the water formed in the reaction in the liquid state, separating said water from said polyamide in the liquid state, and further polymerizing said low polyamide by heating to polyamide-forming temperatures in the presence of viscosity stabilizers until reaching the desired degree of polymerization.

4. A process for the production of polymers of 11-amino undecanoic acid, comprising the steps of heating monomeric 11-amino undecanoic acid in a closed vessel in the presence of at least 50% by weight of water to temperatures above 180° C. whereby to cause formation of a low polymer, cooling the vessel to solidify said low polymer, opening said vessel while maintaining the same at a temperature at which the water is in the liquid state, decanting off the water, washing said low polymer and finally further polymerizing said low polymer by heating it to polyamide-forming temperatures.

5. A process for the production of polymers of 11-amino undecanoic acid, comprising the steps of heating monomeric 11-amino undecanoic acid in a closed vessel in the presence of at least 50% by weight of water to temperatures above 180° C. whereby to cause formation of a low polymer, separating the water contained in said vessel, in the liquid state, from said low polymer, extracting this latter with organic solvents, and further polymerizing said low polymer by heating the same to polyamide-forming temperatures.

6. A process for the production of polymers of 11-amino undecanoic acid, comprising the steps of heating monomeric 11-amino undecanoic acid in a closed vessel to temperatures above 180° C. in the presence of at least 50% by weight of water and of substances chosen from the group consisting of sodium hydroxide, sodium carbonate, potassium hydroxide, potassium carbonate, piperidine, piperidine chloride, glycolic acid, butyric acid, butyrolactone, and hydrochloric acid whereby to cause formation of a low polymer, separating the water contained in said vessel, in the liquid state, from said low polymer, and further polymerizing this latter by heating the same to polyamide-forming temperatures.

7. A process for the production of polymers of 11-amino undecanoic acid, comprising the steps of heating the monomeric 11-amino undecanoic acid in the presence of at least 50% by weight of water at temperatures between 200° and 230° C., whereby to cause formation of a low polyamide, maintaining the water initially present and the reaction water formed concurrently with the polyamide, in the liquid state, separating said water in the liquid state from said polyamide, and further polymerizing said polyamide by heating the same.

8. A process for the production of polymers of 11-amino undecanoic acid, comprising the steps of heating a mixture of monomeric 11-amino undecanoic acid and water containing from 50% to 55% by weight of water, to a temperature above 180° C. whereby to cause formation of a low polyamide, maintaining the water initially present and the reaction water formed concurrently with a polyamide, in the liquid state, separating said water in the liquid state from said polyamide, and further polymerizing said low polyamide by heating the same.

9. A process according to claim 8, comprising adding a further amount of water to the mixture of 11-amino undecanoic acid and water prior to heating the same at temperatures above 180° C.

References Cited in the file of this patent

UNITED STATES PATENTS 2,163,636    Spanagel _____ June 27, 1939

FOREIGN PATENTS 1,024,583    France _____ Jan. 10, 1953